Patented Oct. 19, 1948

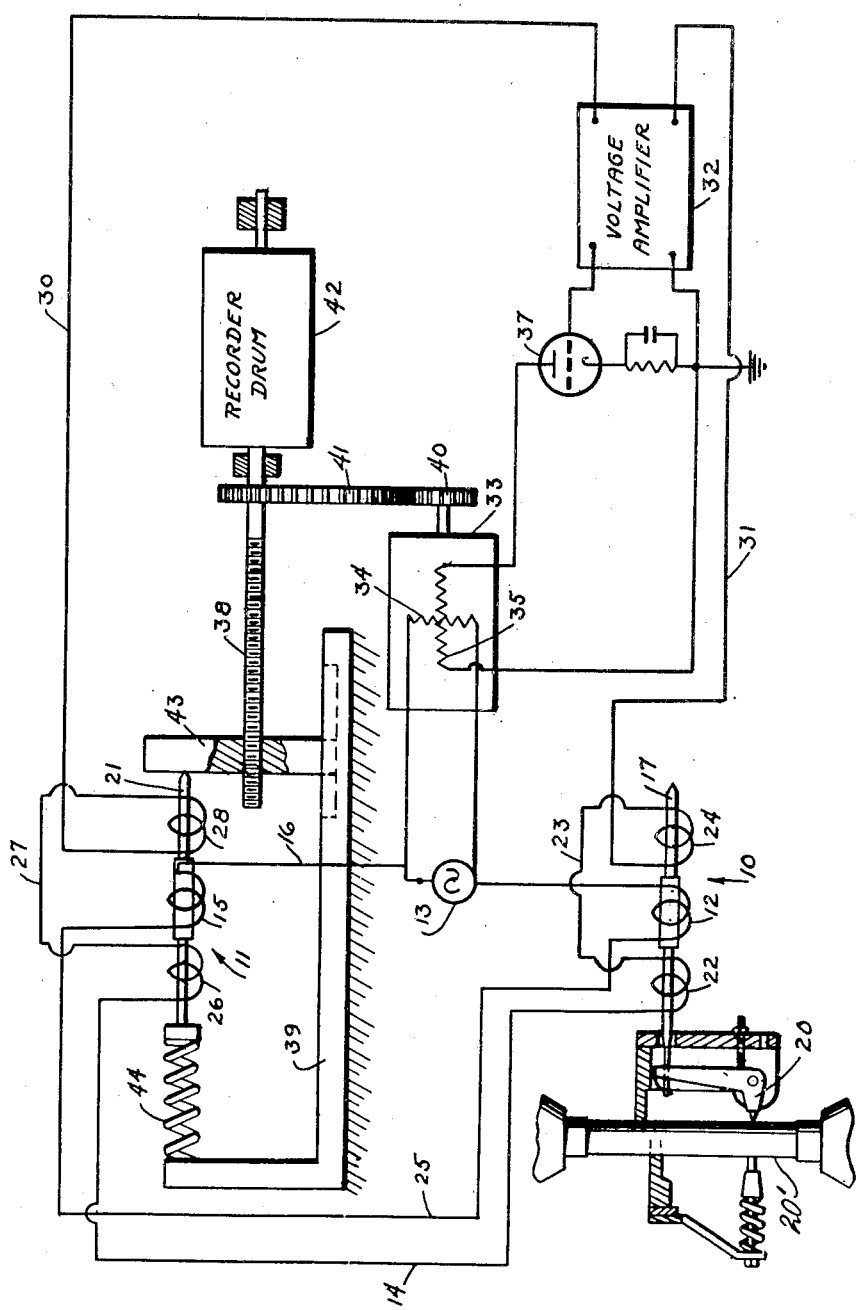

2,451,757

UNITED STATES PATENT OFFICE 2,451,757

MOTION RECORDING APPARATUS

William D. Macgeorge, Drexel Hill, Pa., assignor to The Baldwin Locomotive Works, a corporation of Pennsylvania Application July 18, 1944, Serial No. 545,498

3 Claims. (Cl. 318—28)

This invention relates generally to motion recording apparatus and particularly to stress-strain recorders.

In the art of materials testing many efforts have been made to provide a stress-strain recording system in which the strain functions in response to changes in an extensometer incident to application of load to a specimen, but as developed hitherto they have been deficient in certain particulars. This is because, among other reasons, an extensometer for a materials testing machine is a highly sensitive instrument and is capable of transmitting accurately only a very minute and delicate force. Another disadvantage lay in the fact that in some prior art employing two coordinated magnetic units unpredictable errors arose from differences in the effective resistances of variable length connectors used to join such units together. This difficulty has been heretofore overcome only by providing connectors of a fixed length between such units which obviously interfered with the flexibility of installation and efficiency of the system.

It is among the objects of this invention to simplify and cheapen motion recording systems such as stress-strain recorders; to provide a stress-strain recorder so arranged in an improved manner that the lengths of wires or differentials between lengths of wires used for joining the parts can have no appreciable effect on the balancing of the system or its accurate functioning; to provide an improved electrical follow-up system whereby an electric motor is actuated as a function of a selected primary movement, which may be quite small, and which motor in my preferred embodiment actuates in an improved manner both a device and also an electrical agency having "follow-up" characteristics and is arranged to stop the running of the motor when the functional running has been completed; to provide an improved recorder arranged to respond to a very small and negligible actuating force; to provide an improved system by which to attain a continuous record of instantaneous stress-strain readings; to provide a stress-strain recorder system which is free from "cyclic" actions and is not disturbed by vibrations nor the positions of installation; to provide a stress-strain recorder system having a linear response to unbalance due to existence of strain; and to provide a stress-strain recorder using the null method of control; while other objects and advantages will become more apparent as the description proceeds.

In the accompanying drawing forming part of this description, the figure represents a diagrammatic disclosure of one embodiment of the invention.

The term "microformer" as used herein refers to an induction device comprising a combination of three coils and a core common to and relatively movable in the three coils, and which coils comprise a central stabilizing primary coil supplied with a continuous alternating current flux, and a pair of oppositely wound secondary induction coils in series on opposite sides of the primary coil, as identified and described, for instance, in applicant's copending application Serial No. 532,673, filed April 25, 1944, now Patent Number 2,427,866, patented September 23, 1947.

In its simplest form the invention comprises a pair of "microformers" which are identical and are arranged in a network in series so that whatever resistances the connectors may have they will affect both "microformers" equally. The "microformers" at the start of a test are in balance so that there is electrical balance in the network. A reversible motor is provided in the network for actuating a recorder drum in response to and as a function of unbalance of the network by one "microformer," and the motor in running also actuates the other "microformer" to reestablish the balance of the network circuit by nullifying the effect of the unbalance of the first "microformer," to stop the running of the motor and such device after its predetermined functional running has been completed.

Referring now to the drawing, the system preferably comprises an active first "microformer" 10 and a second or follow-up "microformer" 11. The active first "microformer" comprises a central stabilizing primary coil 12, connected to one side of a source of A. C. as at 13, and at the other side it extends through a connector 16 to an identical complemental stabilizing primary coil 15 of the follow-up "microformer" 11, and through connector 25 to the other side of the A. C. source 13. It will be clear that there will be the same current flow in coils 12 and 15 regardless of the length or characteristics of connectors 14 and 16, so that the respective "microformers" may be both disposed in relatively close adjacency to the source 13, or individually and alternately as respectively far from the source 13 as desired without any particular effect on the system. The first "microformer" 10 has a relatively floating core 17 in position to be axially adjusted in one direction, or both, by movable element 20, which for general follow-up purposes may be comprised of anything, but which is preferably, for general purposes of this invention, the moving part of an extensometer of a materials testing machine. Such an extensometer may move as a result of yield of the test specimen 20' as the load is applied and strain develops. A complemental or follow-up core element 21 is mounted in the primary coil 15 of the follow-up "microformer," and both core pieces are also provided with pairs of oppositely wound secondary or induction coils with each pair respectively in series. Thus, the first "microformer" 10 has a secondary coil 22, the inner end of which, adjacent to the primary coil 12, by connector 23 leads into the coupled oppositely wound secondary or induction coil 24, at a point remote from the primary coil 12. The outer end of the first mentioned secondary coil 22 of microformer 10 leads through connector 14 to the outer end of secondary coil 26 of the "microformer" 11, and the inner end of this latter coil adjacent to the primary coil 15 thereof, leads through connector 27 to the outer end of secondary coil 28 of this "microformer." The inner end of this last mentioned secondary coil 28, by a connector 30, leads to a voltage amplifier 32, while the inner end of secondary coil 24, by a connector 31, is also connected to amplifier 32.

The two phase reversible induction recorder motor 33, which illustratively only, may comprise a motor described in Brown Instrument Company Bulletin No. 51–6, has one stator field 34 constantly energized by the A. C., but as the motor requires a rotating magnetic field the motor is stationary until another source of A. C. is effective to energize field 35 with a current, the phase of which either lags or leads the phase of the current in field 34 and the direction of substantially 90° phase offset, whether lag or lead, determines the direction of running of motor 33. A power amplifier circuit 37 is in the output of the voltage amplifier and actuates field 35 of motor 33 as a function of the unbalance and phase sense of unbalance of the respective "microformers."

The reversible motor 33 drives the threaded shaft 38, by means of gears 40 and 41 or the like, and the shaft both drives the drum 42 and also axially displaces the traveling threaded nut 43. The traveling nut or abutment 43 is maintained in constant abutting relation to one end of the floating core 21, which relation is maintained by the compression spring 44 engaging the opposite end of the core and a fixed support 39 so that the position of the core 21 axially in respect to its coils is always controlled by the position of the abutment 43.

With the cores of both "microformers" in the same relative position in their respective group of coils, either centered or asymmetrical in the same sense or direction, it will be seen that there will be no flow through the voltage amplifier. In the first instance because there is no current induced in one of the induction coils of one phase that is not nullified by an identical current of opposite phase induced in the opposite but complemental series induction coil of the "microformer," and in the second instance because any preponderance of induced current of a given phase in one of a pair of coupled secondary coils of a "microformer" is always nullified in the network by the similar induced current of opposite phase in the network arising from the other "microformer."

Starting, therefore, from any condition of balance in the network because of identical disposition of both cores in their coils, and with the motor 33 and therefore the drum 42 and travelling nut 43 both at rest because of the absence of the two A. C. currents 90° out of phase in the motor, let it be assumed that the test is started and the application of stress to a test piece begins. At the start, with the core of a "microformer" in the axial center of the three coils, the current induced in one secondary coil with 90° effective lead of its phase over that of the voltage in the primary coil, will be neutralized by the 90° effective lag in phase of the coupled series secondary coil and the induced current will be null. Similarly, when the core of the "microformer" is asymmetrical so that the current induced with 90° effective lag or lead in one secondary coil is smaller than that induced with a phase 180° from the first, there will be an induced current output of the "microformer" which will have the last mentioned phase. If the core of the complemental "microformer" is similarly but oppositely positioned, there will be a resultant output of induced current having a phase 180° from the induced output of the first "microformer," which, of course, will effect nullity as far as current flowing through the network and amplifier is concerned. Finally, with an induced current in one "microformer" and none or such small induced current as to be ineffectual to establish a null in the circuit, there will be an amplified application of power to the field of the motor of such phase as to drive the motor in a selected direction. The movable element 20 of the extensometer is imparted a slight movement as a result of relative movement of a part or surface of the test piece 20' and the element 20, and the core piece 17 is therefore moved relative to its coils at a rate a function of the application of stress and the manifestation of strain. Granted that such movement is so slight as to be considered negligible, yet it effects such definite unbalance and asymmetry to the core 17 that the current induced of one phase in one coil 22 or 24 preponderates over that induced of the opposite nullifying phase in the other coil, and the circuit through both "microformers" and the voltage amplifier 32 and passing through the power amplifying circuit 37 impresses A. C. of phase shifted approximately 90° in the proper sense and direction from that of source 13 and energizes the field 35 and the motor begins running. It will continue to run as a direct function of the amount of shifting imparted to the core 17. The running of the motor 33 causes movement of the abutment 43 and the repositioning of the core 21, until the induced output of either secondary coil 26 or 28 of the "microformer" 11 as the preponderating coil, is proper to exactly nullify the induced current arising from the first "microformer" and the flow through the amplifier 32 stops, with an immediate stopping of the motor 33.

The many uses for such a device will be evident, as it is available for almost any follow-up functions where it is important to obviate lag in response, but especially its efficient functioning with the recording device of a stress-strain testing instrument will be most clear.

It will of course be understood that various changes in details of construction and arrangement of parts may be made by those skilled in the art without departing from the spirit of the invention as set forth in the appended claims:

I claim:

1. An electrical follow-up system comprising a network including a first and a second "microformer," each "microformer" comprising a primary coil and a pair of relatively oppositely wound secondary coils juxtaposed to relatively spaced by and in axial alignment with the primary coil, and a core common to and relatively movable axially of the coils of each "microformer," the network including means joining the respective secondary coils of both "microformers" in series, means in the network joining the respective primary coils in series with a source of alternating current so that the current through both primary coils is identical, a multiple phase motor having one of its winding continuously connected to and energized by current from the same source which supplies said primaries and other of its windings having a continuous connection to said secondaries so as to be responsive to an unbalance created by movement of the core of one "microformer" toward unbalance of the network, means for axially moving a core of one "microformer" to establish such unbalance, and means operably coupling said motor and the core of the other of said "microformers" to move said last mentioned core proportionally to the movement of the first mentioned core toward balance of the network.

2. An electrical follow-up system comprising a first and a second "microformer," each "microformer" comprising a primary coil between and coaxial with two relatively oppositely wound secondary coils and a relatively axially movable core in the respective coils, means establishing a network including the secondary coils and a reversible multiple phase motor having certain of its windings continuously in series with said secondary coils, means joining the respective primary coils of both "microformers" in series with a source of alternating current so that the current through both primary coils is identical, and means continuously connecting said source with said primary coils and with other windings of said motor.

3. An electrical follow-up system comprising a first and a second "microformer," each "microformer" comprising a primary coil substantially coaxial with and between two relatively oppositely wound secondary coils and a relatively movable core in and common to the said three coils, means establishing a network including the respective secondary coils of both the "microformers" and a reversible multiple phase motor having certain of its windings continuously in series with said secondary coils, means joining the respective primary coils of both "microformers" continuously in series with a source of alternating current and with another winding of said motor so that the current through both primary coils and through said latter motor winding is identical, said network being susceptible to unbalance as the relative position of one core in its respective coils changes with respect to the relative position of the other core in its respective coils, said motor being arranged to run as a function of such unbalance, means for axially moving the core of one of the said "microformers" and said motor being operatively coupled to the core of the other of said "microformers" to reposition same axially as a function of the running of the motor, to stop the motor by balancing the network including the motor with the respective cores in relatively the same axial setting in both of said "microformers."

WILLIAM D. MACGEORGE.

REFERENCES CITED

The following references are of record in the file of this patent:

UNITED STATES PATENTS

| Number | Name | Date |
| --- | --- | --- |
| 2,210,970 | Bonell | Aug. 13, 1940 |
| 2,215,148 | Ehrler | Sept. 17, 1940 |
| 2,285,540 | Stein et al. | June 9, 1942 |
| 2,299,997 | Ladrach | Oct. 27, 1942 |
| 2,316,914 | Templin | Apr. 20, 1943 |
| 2,348,177 | Keeler | May 2, 1944 |
| 2,353,691 | Clingman | July 18, 1944 |
| 2,359,927 | Melas | Oct. 10, 1944 |

FOREIGN PATENTS

| Number | Country | Date |
| --- | --- | --- |
| 127,311 | Switzerland | Apr. 19, 1927 |